United States Patent
Alanen et al.

(10) Patent No.: US 11,849,467 B2
(45) Date of Patent: Dec. 19, 2023

(54) SELECTING TRANSMISSION RESPONSE MESSAGE TRANSMITTER

(71) Applicant: Nokia Technologies Oy, Espoo (FI)

(72) Inventors: Olli Alanen, Vantaa (FI); Jari Pekka Mustajarvi, Espoo (FI); Hans Thomas Hohne, Helsinki (FI); Janne Petteri Tervonen, Espoo (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 102 days.

(21) Appl. No.: 16/976,003

(22) PCT Filed: Feb. 25, 2019

(86) PCT No.: PCT/EP2019/054522
§ 371 (c)(1),
(2) Date: Aug. 26, 2020

(87) PCT Pub. No.: WO2019/170446
PCT Pub. Date: Sep. 12, 2019

(65) Prior Publication Data
US 2021/0045087 A1    Feb. 11, 2021

(30) Foreign Application Priority Data

Mar. 8, 2018  (FI) ...................................... 20185217

(51) Int. Cl.
*H04W 72/30* (2023.01)
*H04W 8/08* (2009.01)
*H04W 74/08* (2009.01)

(52) U.S. Cl.
CPC ............. *H04W 72/30* (2023.01); *H04W 8/08* (2013.01); *H04W 74/0816* (2013.01)

(58) Field of Classification Search
CPC . H04W 72/005; H04W 8/08; H04W 74/0816; H04W 74/006
See application file for complete search history.

(56) References Cited

U.S. PATENT DOCUMENTS

2014/0162688 A1* 6/2014 Edge ...................... H04W 4/06
455/456.1
2014/0328241 A1* 11/2014 Subramanian ........ H04W 4/027
370/312
(Continued)

FOREIGN PATENT DOCUMENTS

CN    106470090 A    3/2017
CN    107439035 A    12/2017
(Continued)

OTHER PUBLICATIONS

Tian Kaibo et al., "Multiple CTSs in Mu-Mimo transmission," doc.: IEEE 802.11-10/1067r0, XP017676230, 10 pages, Sep. 15, 2010.
(Continued)

*Primary Examiner* — Chae S Lee
(74) *Attorney, Agent, or Firm* — Lippes Mathias LLP (57) ABSTRACT

There is provided a method in an access point, the method comprising: grouping a plurality of terminal devices that are within certain radio distance from each other into same group; selecting a single terminal device of the group to reply to a transmission request message on behalf of the group; transmitting the transmission request message, wherein the transmission request message indicates the single selected terminal device of the group that should reply to the transmission request message on behalf of the group; and in response to the transmitting the transmission request message, initiating receiving a transmission response message from the single selected terminal device on behalf of the group.

17 Claims, 8 Drawing Sheets

(56) References Cited

U.S. PATENT DOCUMENTS

| | | | |
|---|---|---|---|
| 2014/0334435 A1* | 11/2014 | Al-Shalash | H04L 5/0051 |
| | | | 370/330 |
| 2016/0081106 A1 | 3/2016 | Zhou et al. | |
| 2016/0164654 A1* | 6/2016 | Huang | H04B 7/0452 |
| | | | 370/392 |
| 2016/0227569 A1 | 8/2016 | Wang et al. | |
| 2017/0041798 A1 | 2/2017 | Li et al. | |
| 2017/0070866 A1* | 3/2017 | Sato | H04W 4/08 |
| 2017/0215221 A1 | 7/2017 | Segev et al. | |
| 2017/0366244 A1* | 12/2017 | Lee | H04B 7/0619 |
| 2018/0007712 A1 | 1/2018 | Lou et al. | |
| 2018/0109996 A1* | 4/2018 | Wang | H04W 4/08 |

FOREIGN PATENT DOCUMENTS

| | | |
|---|---|---|
| EP | 3 160 058 A1 | 4/2017 |
| WO | WO 2015/162857 A1 | 10/2015 |
| WO | WO-2016075124 A1 * | 5/2016 ............ H04W 76/27 |
| WO | WO 2017/120418 A1 | 7/2017 |

OTHER PUBLICATIONS

Xiufeng Xie et al., "Scalable User Selection for MU-MIMO Networks," IEEE INFOCOM 2014—IEEE Conference on Computer Communications, pp. 808-816, 2014.

International Search Report for PCT/EP2019/054522 dated Apr. 16, 2019.

* cited by examiner

SELECTING TRANSMISSION RESPONSE MESSAGE TRANSMITTER

FIELD

The invention relates to communications.

BACKGROUND

IEEE 802.11ax is a new standard in the IEEE 802.11 types of WLANs, which is designed to improve usage of spectrum, especially in dense environment, along with an enhanced user experience. The IEEE 802.11ax standard implements several mechanisms to serve more users consistent and reliable data throughput in crowded wireless environments. The IEEE 802.11ax introduces a new concept called Orthogonal Frequency-Division Multiple Access (OFDMA) which means that an access point can schedule terminal devices to send and receive simultaneously, multiplexed in frequency domain. A Multiuser Request to Send (MU-RTS) message is used with the OFDMA instead of a traditional Request to Send (RTS) message. The MU-RTS concept does not define how the access point selects the terminal devices that reply to the MU-RTS message and bad selection may decrease radio network performance. Hence, a sophisticated method is needed for scheduling the terminal devices to reply the MU-RTS.

BRIEF DESCRIPTION

The invention is defined by the independent claims.

According to an aspect, a method in an access point, the method comprises: grouping a plurality of terminal devices that are within certain radio distance from each other into same group; selecting one or more terminal devices of the group to reply to a transmission request message on behalf of the group; transmitting the transmission request message indicating the selected one or more terminal devices; and in response to the transmitting the transmission request message, initiating receiving a transmission response message from the selected one or more terminal devices.

In an embodiment, the grouping is based at least on location information on the plurality of terminal devices.

In an embodiment, the location information on the terminal devices comprises satellite positioning data and/or positioning data from a separate indoor positioning system.

In an embodiment, the grouping is based at least on radio measurement results obtained on the basis of radio measurements performed by the plurality of terminal devices.

In an embodiment, the method further comprises: transmitting a request message requesting the plurality of terminal devices to perform the radio measurements; receiving the radio measurement results in response to the request message; and grouping the terminal devices based at least on comparing the radio measurement results obtained from the plurality of terminal devices.

In an embodiment, the request message requests the plurality of terminal devices to perform radio measurements regarding one or more neighbouring access points.

In an embodiment, the request message requests the plurality of terminal devices to perform radio measurements on other terminal devices.

In an embodiment, the radio measurement results comprise information indicative of round trip time between the terminal devices and a first wireless apparatus and round trip time between the terminal devices and a second wireless apparatus.

In an embodiment, the radio measurement results comprise direction information indicating direction of a first wireless apparatus with respect to the terminal devices and direction of a second wireless apparatus with respect to the terminal devices.

In an embodiment, the radio measurement results comprise signal strength information indicating a signal strength between the terminal devices and a first wireless apparatus, and the signal strength between the terminal devices and a second wireless apparatus.

In an embodiment, the transmission request message comprises information indicating the selected one or more terminal devices requested to reply to the transmission request message and scheduling information for transmitting the transmission response message by the selected one or more terminal devices.

In an embodiment, the method further comprises: selecting more than one terminal device to reply to the transmission request message, if radio distance between two terminal devices in the group exceeds a threshold.

According to another aspect, a method in a terminal device of a wireless network, the method comprises: receiving, from an access point of the wireless network, a transmission request message indicating selected one or more terminal devices, wherein the one or more terminal devices are selected to respond to the transmission request message on behalf of a group of a plurality of terminal devices that are within certain radio distance from each other; determining whether or not the terminal device is amongst the selected one or more terminal devices; in response to determining that the terminal device is selected, transmitting a transmission response message to the access point on behalf of the group.

According to another aspect, there is provided an apparatus, the apparatus comprising one or more processor and one or more memory including a computer program code, wherein the one or more memory and the computer program code are configured, with the one or more processor, to cause an access point to: group a plurality of terminal devices that are within certain radio distance from each other into same group; select one or more terminal devices of the group to reply to a transmission request message on behalf of the group; transmit the transmission request message indicating the selected one or more terminal devices; and in response to the transmitting the transmission request message, initiate receive a transmission response message from the selected one or more terminal devices.

In an embodiment, the grouping is based at least on location information on the plurality of terminal devices.

In an embodiment, the location information on the terminal devices comprises satellite positioning data and/or positioning data from a separate indoor positioning system.

In an embodiment, the grouping is based at least on radio measurement results obtained on the basis of radio measurements performed by the plurality of terminal devices.

In an embodiment, the one or more memory and the computer program code are configured, with the one or more processor, to cause the access point to: transmit a request message requesting the plurality of terminal devices to perform the radio measurements; receive the radio measurement results in response to the request message; and group the terminal devices based at least on comparing the radio measurement results obtained from the plurality of terminal devices.

In an embodiment, the request message requests the plurality of terminal devices to perform radio measurements regarding one or more neighbouring access points.

In an embodiment, the request message requests the plurality of terminal devices to perform radio measurements on other terminal devices.

In an embodiment, the radio measurement results comprise information indicative of round trip time between the terminal devices and a first wireless apparatus and round trip time between the terminal devices and a second wireless apparatus.

In an embodiment, the radio measurement results comprise direction information indicating direction of a first wireless apparatus with respect to the terminal devices and direction of a second wireless apparatus with respect to the terminal devices.

In an embodiment, wherein the radio measurement results comprise signal strength information indicating a signal strength between the terminal devices and a first wireless apparatus, and the signal strength between the terminal devices and a second wireless apparatus.

In an embodiment, the transmission request message comprises information indicating the selected one or more terminal devices requested to reply to the transmission request message and scheduling information for transmitting the transmission response message by the selected one or more terminal devices.

In an embodiment, the apparatus further comprising: selecting more than one terminal device to reply to the transmission request message, if radio distance between two terminal devices in the group exceeds a threshold.

According to another aspect, there is provided an apparatus, the apparatus comprising one or more processor and one or more memory including a computer program code, wherein the one or more memory and the computer program code are configured, with the one or more processor, to cause a terminal device to: receive, from an access point of the wireless network, a transmission request message indicating selected one or more terminal devices, wherein the one or more terminal devices are selected to respond to the transmission request message on behalf of a group of a plurality of terminal devices that are within certain radio distance from each other; determine whether or not the terminal device is amongst the selected one or more terminal devices; in response to determining that the terminal device is selected, transmit a transmission response message to the access point on behalf of the group.

According to another aspect, there is provided an apparatus, the apparatus comprising: means for grouping a plurality of terminal devices that are within certain radio distance from each other into same group; means for selecting one or more terminal devices of the group to reply to a transmission request message on behalf of the group; means for transmitting the transmission request message indicating the selected one or more terminal devices; and means for initiating reception of a transmission response message from the selected one or more terminal devices in response to the transmitting the transmission request message.

According to another aspect, there is provided an apparatus for a terminal device, the apparatus comprising: means for receiving, from an access point of the wireless network, a transmission request message indicating selected one or more terminal devices, wherein the one or more terminal devices are selected to respond to the transmission request message on behalf of a group of a plurality of terminal devices that are within certain radio distance from each other; means for determining whether or not the terminal device is amongst the selected one or more terminal devices; means for, in response to determining that the terminal device is selected, transmitting a transmission response message to the access point on behalf of the group.

According to another aspect, there is provided a computer readable medium comprising program instructions for causing an access point to perform at least the following: grouping a plurality of terminal devices that are within certain radio distance from each other into same group; selecting one or more terminal devices of the group to reply to a transmission request message on behalf of the group; transmitting the transmission request message indicating the selected one or more terminal devices; and in response to the transmitting the transmission request message, initiating receiving a transmission response message from the selected one or more terminal devices.

According to another aspect, there is provided a computer readable medium comprising program instructions for causing a terminal device to perform at least the following: receiving, from an access point of the wireless network, a transmission request message indicating selected one or more terminal devices, wherein the one or more terminal devices are selected to respond to the transmission request message on behalf of a group of a plurality of terminal devices that are within certain radio distance from each other; determining whether or not the terminal device is amongst the selected one or more terminal devices; in response to determining that the terminal device is selected, transmitting a transmission response message to the access point on behalf of the group.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
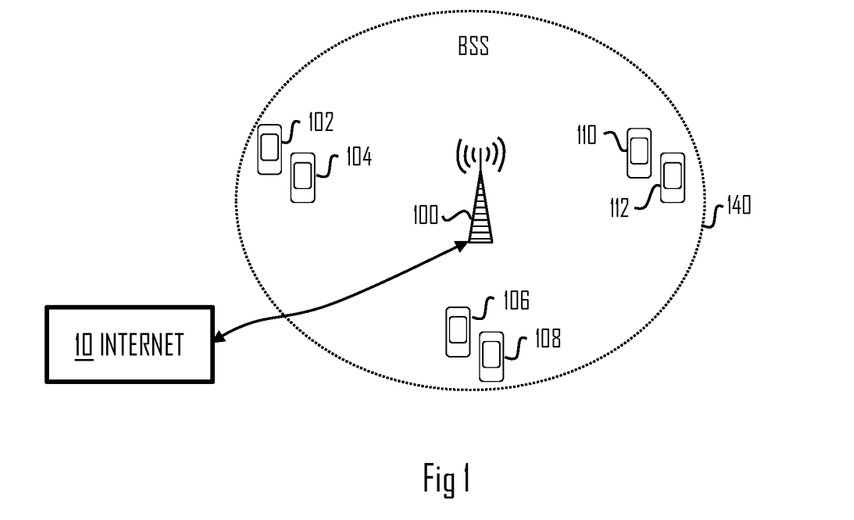
FIG. 1 illustrates a wireless communication scenario to which embodiments of the invention may be applied.

FIG. 1 illustrates a general architecture of a wireless communication system to which embodiments of the invention may be applied. FIG. 1 illustrates a basic service set (BSS) including an access point (AP) 100 and a plurality of terminal devices (STA) 102, 104, 106, 108, 110, 112. A protection area of RTS message (140) is also presented in the FIG. 1. The basic service set (BSS) is a basic building block of an IEEE 802.11 wireless local area network (WLAN). The most common BSS type is an infrastructure, which includes a single access point together with all associated terminal devices. The AP may be a fixed AP or it may be a mobile AP. The APs 100 may also provide access to other networks e.g. the Internet 10. In another embodiment, at least one of the BSSs is an independent BSS (IBSS) or a mesh BSS (MBSS) without a dedicated AP, and in such embodiments the terminal device 100 may be a non-access point terminal station.

While embodiments of the invention are described in the context of the above-described topologies of IEEE 802.11 and, particularly, IEEE 802.11ax, it should be appreciated that other embodiments of the invention are applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

IEEE 802.11ax is specified for both downlink and uplink multi-user operation by means of Multi-user Multiple-input and Multiple-Output (MU-MIMO) and Orthogonal Frequency Division Multiple Access (OFDMA) technology. This means that the access point can schedule the terminal devices to send and receive simultaneously, multiplexed in frequency and spatial domain. This set new requirements for a Request to Send (RTS) and a Clear to Send (CTS) protocol because the traditional RTS/CTS can be used only for 1-to-1 connections. The RTS is a transmission request message and is used to query whether or not at least one of said plurality of channels is free for transmission. The CTS is a transmission response message which indicates that at least one channel of the second wireless communication apparatus has detected to be free. After successful RTS-CTS frame exchange, the actual data transmission can be performed, while failure of RTS or CTS prevents the data transmission.

To solve the challenge of the 1-to-1 connection of the traditional RTS/CTS the new concept called Multiuser Request to Send (MU-RTS) is introduced for IEEE 802.11ax. The MU-RTS can schedule the one or more terminal devices to reply to a single MU-RTS frame and hence distribute a virtual carrier sensing (NAV) information to protect transmissions. The scheduling of the one or more terminal devices can lead the situation where a plurality of terminal devices reply with the CTS message on each 20 MHz block used for the OFDMA transmission and this may lead to collision of the CTS messages. The collision of the CTS messages may cause a situation where the AP may assume that the transmission is not possible to perform because it does not receive any CTS messages from the terminal devices because of the collisions. Referring to FIG. 1, the AP 100 may transmit MU-RTS message and request the all terminal devices 102, 104, 106, 108, 110, 112 to reply with the CTS message. In this scenario, the all terminal devices may reply with the CTS message, which reduces a performance of radio network and may cause over-protection, which also reduces performance of the network. Another potential problem is under-protection, which may happen if AP selects the CTS repliers to be a non-representative group of the terminals that are scheduled in the actual data exchange following the MU-RTS-CTS frame exchange. Therefore, there is provided a solution which may be used to enhance the performance of the network by enhancing the MU-RTS/CTS messaging between AP and terminal devices.

Figure 2A:
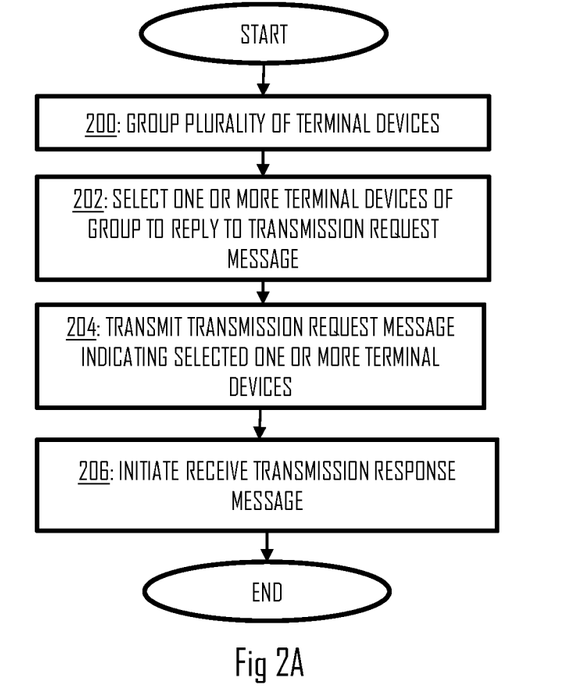
FIG. 2A illustrates a flow diagram of a process according to an embodiment.

FIG. 2A illustrates a flow diagram according to an embodiment. Referring to FIG. 2A, the process comprises: grouping (block 200) a plurality of terminal devices that are within certain distance from each other into same group; selecting (block 202) one or more terminal devices of the group to reply to a transmission request message on behalf of the group; transmitting (block 204) the transmission request message indicating the selected one or more terminal devices; and in response to the transmitting the transmission request message, initiating receiving (block 206) a transmission response message from the selected one or more terminal devices.

The process of FIG. 2A may be performed by AP 100, for example. It is equally possible that the entity performing the steps of FIG. 2A may be an apparatus or circuitry that is part of the AP 100. In the embodiment of FIG. 2A, the access point may group associated 802.11ax compliant terminal devices based on location information on the terminal devices. When the distance between the terminal devices is inside the certain limit then the terminal devices are considered to be close to each other and are grouped into the same group.

Figure 2B:
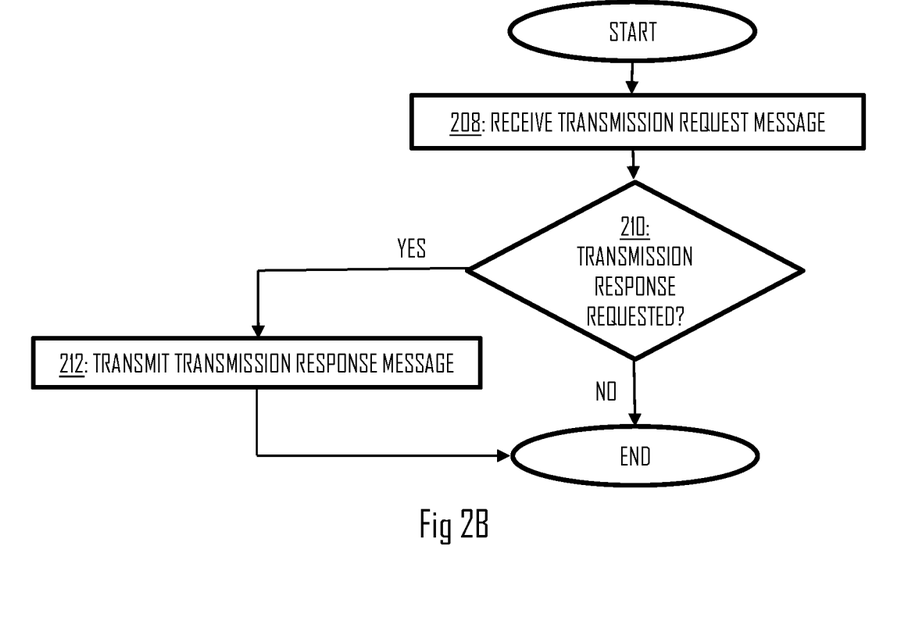
FIG. 2B illustrates a flow diagram of a process according to an embodiment.

FIG. 2B illustrates an embodiment. Referring to FIG. 2B, a method comprises receiving, from an access point, a transmission request message indicating selected one or more terminal devices, wherein the one or more terminal devices are selected to respond to the transmission request message on behalf of a group of a plurality of terminal devices that are located within certain distance from each other (block 208); determining whether or not the terminal device is amongst the selected one or more terminal devices (block 210); in response to determining that the terminal device is selected, transmitting a transmission response message to the access point on behalf of the group (block 212). If the terminal device is not selected, the transmission request message may not indicate the terminal device and thus the process may end after step 210.

The process of FIG. 2B may be performed by a terminal device, such as terminal device 102 and/or by an apparatus or circuitry comprised in a terminal device.

The one or more terminal devices from the group may be selected to reply with the CTS message to the MU-RTS message transmitted by the access point. That is, in an embodiment this means that a single terminal device is selected (i.e. only one terminal device of the group is selected) to transmit the response on behalf of the other members of the group. The one or more terminal devices, which are selected to reply with CTS are indicated in the MU-RTS message. For example, the MU-RTS message comprises information indicating the selected one or more terminal devices requested to reply to the MU-RTS message and scheduling information for transmitting the CTS message by the selected one or more terminal devices.

The location information discussed above may be any kind of location or position information indicating the position of the terminal devices explicitly or implicitly (e.g. requiring further processing of the location information) satellite positioning data like Global Positioning System (GPS) data and/or positioning data from separate indoor position system (IPS). The access point can also request the terminal devices to perform radio measurements and based on the radio measurement data, the access point may know the location of the terminal devices and use that data to group the terminal devices. The data used for the grouping by the access point may be received from the all terminal devices which are on the range of the access point, not only from the terminal devices which are selected to reply with the CTS message.

It is pointed out that the grouping may be based in an explicit distance indicating parameter (e.g. location) and/or on some other parameter which does not necessarily directly indicate the distance. For example, radio signal strength, signal direction and/or round trip time (RTT) may be used for the grouping. For example, the similarity and/or magnitude of said parameters may be used to determine that the terminal devices belong to the same group (i.e. are grouped in the same group). It is noted that if the terminal devices are not within certain distance from each other, the terminal devices may be grouped into different groups. The number of groups may depend on the location of the terminal devices and/or radio conditions, for example. That is, the more the AP 100 has resources to use, the more groups it may be utilize. Hence, said certain distance may vary between different scenarios. According to an embodiment, the distance is predetermined. In an embodiment, the distance is configurable during operation of the network.

Referring to block 200, the distance used for grouping (e.g. block 200) the terminal devices by AP refers to radio distance between the terminal devices. In some examples, radio distance refers to how the terminal devices measure and/or experience the radio environment, i.e. how the terminal devices measure and/or experience radio signals from wireless apparatuses. For example, two terminal devices within said certain radio distance from each other may measure the same radio signal with substantially the same strength. There may be different ways to group the terminal devices within said certain radio distance from each other to the same group: one example may be the use of radio measurements and the other may be the use of location information (e.g. physical location). It is also possible to use both. Hence, the AP 100 may not necessarily have to measure or calculate the radio distance between the terminal devices. Instead, it may use some radio measurement parameter (e.g. signal strength, direction and/or RTT) and/or physical location indicating parameter to determine whether the terminal devices are within said certain radio distance from each other. For example, a distance parameter determined based on the location information may directly correlate with the radio distance.

Figure 3:
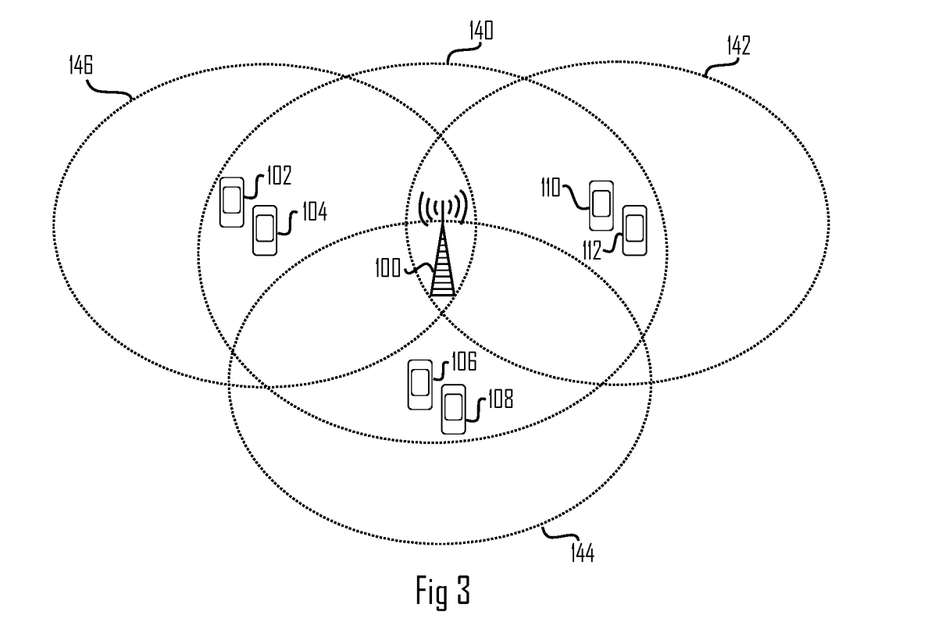
FIG. 3 illustrates an embodiment of grouping terminal devices based on location.

FIG. 3 illustrates an embodiment of grouping the terminal devices based on the location. For example, the access point 100 may form three separate groups based on the location information. Hence, each group may form own CTS protection area 142, 144, 146. The terminal devices 102 and 104 are close to each other and hence are grouped into the same group by the access point 100. The group of the terminal devices 102 and 104 may form the CTS protection area 146. The terminal devices 106 and 108 are also close to each other (i.e. within a threshold radio distance) but far from the terminal devices 102 and 104 (i.e. radio distance exceeds the threshold or another threshold) and hence the terminal devices 106 and 108 may not be grouped into the same group with the terminal devices 102 and 104 by the access point 100. Therefore, the terminal devices 106 and 108 may be grouped together and the group may form the CTS protection area 144. In addition, the terminal devices 110 and 112 are close to each other but far from the other terminal devices 102, 104, 106, 108 and hence the terminal devices 110 and 112 may be grouped together, and said group may form the CTS protection area 142.

The access point 100 may indicate that one member of each group should reply with the CTS message to the transmitted MU-RTS message by the AP 100. In some cases more than one responder is requested and/or indicated. The group member or members, which should reply with CTS message are indicated in the transmitted MU-RTS message sent by the access point 100. In the example of FIG. 3, three terminal devices, i.e. one per group, may reply with the CTS message to the MU-RTS message. This may improve spectrum usage of the Wireless Local area network (WLAN) compared to the situation where the all six terminal devices would reply with the CTS message. It is further pointed out that there may be two or more groups and each group may comprise two or more terminal devices. However, in some special cases, one group may comprise only one terminal device. This may be caused by the used radio distance threshold(s) and/or threshold(s) to other parameters which are used to group the terminal devices.

Figure 4:
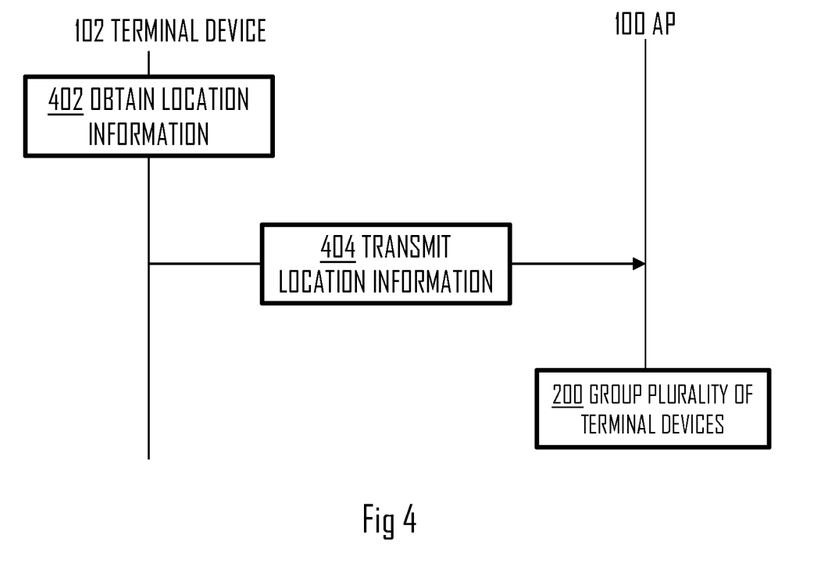
FIG. 4 illustrates a signalling diagram of an embodiment for transmitting location information from the terminal devices to an access point.

FIG. 4 illustrates an embodiment for transmitting the location information from a terminal device to the access point. Terminal device 102 is used as an example, but other terminal devices may perform same actions. The terminal device 102 may obtain the location information as described in the step 402 of FIG. 4. For example, the location information may comprise the satellite positioning data like GPS data and/or separate indoor position system (IPS) data. In the satellite based positioning system, like GPS, signals are transmitted from satellites located in the space and received by receivers in earth. The terminal devices may include a satellite positioning system receiver, which is used to determine the location of the terminal devices. In indoor conditions the satellite positioning data may not possible to use effectively and hence the indoor positioning systems may utilize e.g. radio waves, magnetic fields, acoustic signals or other sensory information for determining the location the terminal devices.

The terminal device may transmit the location information, which it obtains, to the access point as illustrated in the step 404 of FIG. 4. The access point 100 may utilize the location information received from the terminal devices, which are on the range of the access point, for grouping as illustrated in the step 406. The access point can determine the locations of the terminal devices based on the received data and form groups wherein all terminal devices of the same group are within the some certain radio distance from each other. In other words, the access point 100 considers that the terminal devices are close enough (i.e. within certain threshold radio distance) to each other and hence the terminal devices can be members of the same group and form the own CTS protection area. It is yet again pointed out that the AP 100 does not necessarily determine radio distance between terminal devices. Instead, it may utilize some other parameters which inherently may be used to group terminal devices within certain radio distance into the same group.

In an embodiment, the location information is obtained, by the AP 100, via another system (e.g. IPS). Hence, the terminal device may not necessarily have to transmit the location information to the AP 100.

Figure 5A:
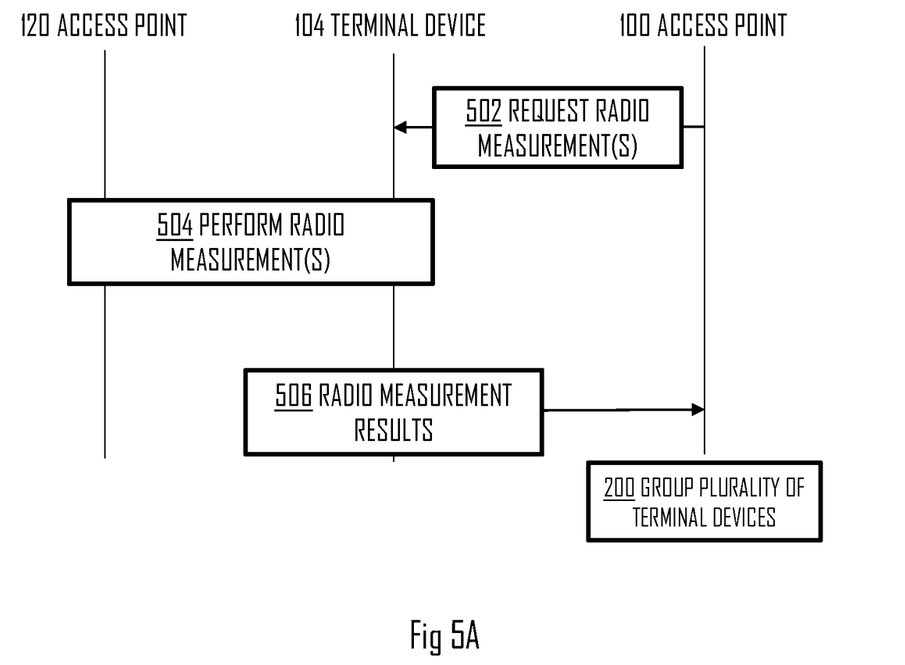
FIG. 5A illustrates a signalling diagram of an embodiment for performing radio measurements between the terminal devices.
Figure 5B:
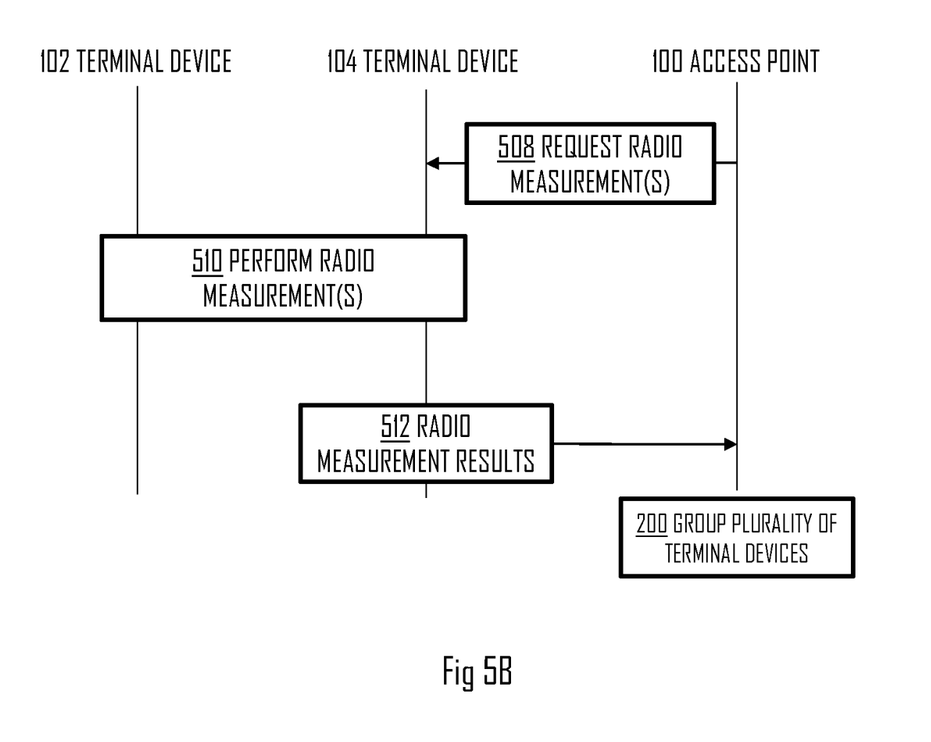
FIG. 5B illustrates a signalling diagram of an embodiment for performing radio measurements between the terminal devices and the access points.

FIGS. 5A and 5B illustrate some embodiments which relate to using radio measurements as a basis for the grouping (e.g. block 200). It is noted that the AP 100 may utilize location information and/or radio measurement information obtained from the terminal devices for the grouping. Therefore, in an embodiment the grouping is based at least on radio measurement results obtained on the basis of radio measurements performed by the plurality of terminal devices.

According to an embodiment, with reference to FIGS. 5A and 5B, the AP 100 transmits (502, 508) a request message requesting the one or more terminal devices to perform the radio measurements; receiving (block 506, 512) the radio measurement results in response to the request message; and grouping (200) the terminal devices based at least on comparing the radio measurement results obtained from the plurality of terminal devices. As noted, the radio measurement results may be used alternatively or in addition to the location information. The terminal devices (e.g. terminal device 104 may perform the measurements as noted in blocks 504 and 510).

According to one embodiment, the AP may request the terminal devices to perform the radio measurements and transmit the result periodically. The terminal device performs the measurements and transmission of the results in intervals determined by the AP. The interval indicates how frequently the terminal device perform the measurements and transmit the results. The radio measurements may be performed periodically, in other word regular basis, then the results of the measurements may also be available regular basis for the AP for grouping the terminal devices.

In another embodiment, the AP requests the terminal devices to perform the radio measurements and as a response to the request, the terminal devices perform the measurements and transmit the results for AP. The terminal devices perform measurements and transmit the results when the AP request to do so.

According to an embodiment, with reference to FIG. 5A, the AP 100 transmits a request to perform the radio measurements to plurality of terminal devices (block 502). The AP 100 requests the terminal devices, e.g. which are on its range, to perform the radio measurements regarding the one or more neighbouring access points (e.g. including access point 120). After receiving the request, the terminal devices may perform the requested radio measurements (block 504) between the terminal devices and the one or more neighbouring access points. The terminal devices may transmit the radio measurement results to the AP (block 506), which requested to perform measurement, in this case to AP 100. The measured radio measurement results may be used for determining the location of the terminal devices, or at least used to compare similarity of results from different terminal devices, thus revealing explicitly or implicitly the radio distance between the terminal devices. After receiving the radio measurement result, the AP 100 groups (block 200) the terminal devices based at least on the received results. The AP 100 can utilize the radio measurement results for determining which terminal devices are located within the certain radio distance from each other and group these terminal devices into the same group. The embodiment described with reference to FIG. 5A may refer to using neighbour measurements for the grouping. I.e. the AP 100 may request the terminal devices to measure AP's 100 neighbours (e.g. signal strength, direction and/or RTT). According to an embodiment, referring to FIG. 5B, the AP 100 transmits a request to perform the radio measurements (block 508). The AP 100 requests the terminal devices, which are on its range, to perform radio measurements regarding the one or more terminal devices (e.g. neighbouring terminal devices). After receiving the request, the terminal devices may perform the requested radio measurements (block 510) between the neighbouring terminal devices. The terminal devices transmit the radio measurement results to the AP 100 (block 512), which requested to perform measurement. The measured radio measurement results may be used for determining the location of the terminal devices, for example. After receiving the radio measurement result, the AP 100 may group (block 200) the terminal devices based at least on the received results. The AP 100 can utilize the results of performed radio measurements between the neighbouring terminal devices for determining which terminal devices are located within the certain radio distance from each other and group these terminal devices into the same group.

According to an embodiment, with reference to FIGS. 5A and 5B, the AP 100 requests the terminal devices to perform the radio measurements regarding to the neighbouring access point (FIG. 5A) and regarding the neighbouring terminal devices (FIG. 5B). This may mean that the AP 100 may request the terminal devices to perform radio measurements from all heard signals. For example, the AP 100 may request the terminal devices to perform the radio measurements regarding the neighbouring terminal devices and the neighbouring access points at the same time. The AP 100 may utilize the result of measurements from all heard signal for determining the locations of the terminal devices, or at least radio distance between terminal devices explicitly or implicitly. The radio measurement results may be utilized by the AP 100 alternatively or in addition to the location information.

Figure 6A:
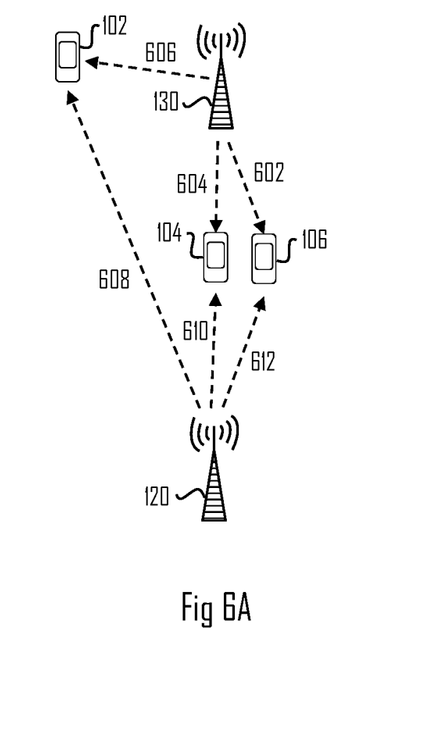
FIG. 6A illustrates an embodiment of performing signal strength measurements.

FIG. 6A illustrates an embodiment for performing signal strength measurements. The measurement may be performed utilizing a Received Signal Strength Indicator (RSSI), for example. The RSSI indicates how well the terminal device can hear a signal from the access point, the higher the RSSI is the stronger the signal is. The RSSI results may also be used for determining the location of the terminal devices. If the RSSI results are similar enough, in other words between certain range, the AP may determine, that the locations of the terminal devices are within some certain radio distance from each other. In other words, the terminal devices are close enough to each other and therefore may be grouped into the same group. RSSI may be measured, for example, utilizing Link Measurement Action Frames. It is noted that other measuring schemas and/or metrics than RSSI may be used. For example, Signal to Noise Ratio (SNR) and/or its derivate(s). However, RSSI is used as an example for simplicity reasons.

Referring to FIG. 6A, an AP, for example AP 100, requests the terminal devices 102, 104 and 106 to measure the RSSI 602, 604, 606, 608, 610, 612 regarding the access points 130 and 120. It is noted that the request may request explicitly to measure APs, terminal devices, or both (i.e. all heard signals). However, in this example, the measurement is performed regarding neighbouring APs 120 and 130. The AP 100 may then utilize the RSSI based location information for grouping the terminal devices. The measurement results may be utilized alternatively or in addition to the other location information. Referring to FIG. 6A, the terminal devices 104 and 106 seems to be close to each other, in other words within certain radio distance from each other, and hence the RSSI results may be assumed to be quite a similar, and therefore the terminal devices 104 and 106 may be grouped into the same group. The terminal device 102 seems to be far from the terminal devices 104 and 106, in other words it is not within certain radio distance from the terminal devices 104 and 106, and therefore the RSSI may be different compared to the results of the terminal devices 102 and 104. Based on this the AP 100 may not group the terminal device 102 into the same group with the terminal devices 104 and 106.

Figure 6B:
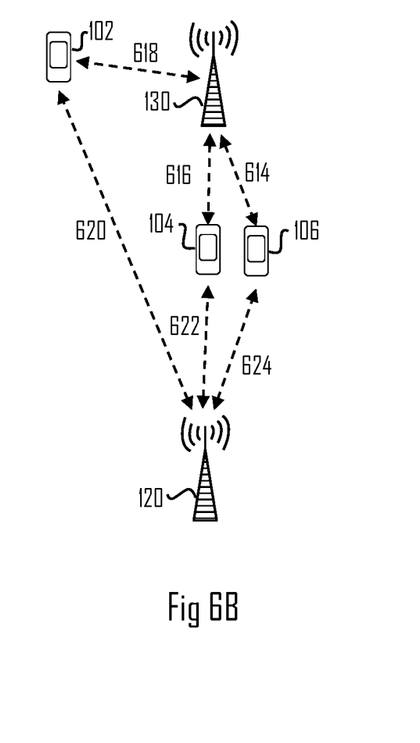
FIG. 6B illustrates an embodiment of performing directional and/or RTT measurements.

FIG. 6B illustrates an embodiment for performing the RTT measurement between the terminal devices and the access points. The RTT is an amount of time, which indicates how long it takes when a signal travels from a sender to a receiver and back to the sender. Results of the RTT measurements may also be used for determining the location of the terminal devices or at least radio distance between different terminal devices. If the RTT results are similar enough, in other words within certain range from each other, the AP 100 may determine that the terminal devices are within some certain radio distance from each other. In other words, the terminal devices are so close to each other that they may be grouped into the same group by the AP 100. When the terminal device performs the RTT measurements for three or more AP, a triangulation can be utilized for determining an estimated location of the terminal device.

Referring to FIG. 6B, the AP 100 requests the terminal devices 102, 104 and 106 to perform the RTT measurements 614, 616, 618, 620, 622, 624 regarding the access points 130 and 120. The AP 100 may then utilize the RTT information determined from the RTT result for grouping the terminal devices. The measurement results may be utilized alternatively or in addition to the other location information. Referring to FIG. 6A, the terminal devices 104 and 106 seems to be close each other, in other words within certain radio distance from each other, and hence the RTT measurement results may be similar, in other words within certain range, and therefore the terminal devices 104 and 106 may be grouped into the same group. The terminal device 102 seems to be far from the terminal devices 104 and 106, in other words it is not within certain radio distance from the terminal devices 104 and 106, and therefore the RTT measurement results may be different compared to the results of the terminal devices 102 and 104. Based on this the AP 100 may not group the terminal device 102 into the same group with the terminal devices 104 and 106.

According to an example embodiment, the RTT information and/or measurements comprise fine timing measurements as specified in 802.11.

According to an embodiment, FIG. 6B illustrates an embodiment for performing a directional measurement. The directional measurements may be performed as an angle of arrival (AoA) or angle of departure (AoD) measurement. The measurement may be based on phase differences measured from the different antenna ports, for example. The directional information indicates a direction of a first access point 120 with respect to the terminal devices 102, 104, 106, and a direction of the terminal devices 102, 104, 106, with respect to a second access point 130. The directional measurement results may be utilized for grouping the terminal devices. If the directional measurement results are within certain range, in other words similar enough, the AP 100 may determine, that the terminal devices are within certain radio distance from each other. In other words, the terminal devices are close enough to each other and therefore may be grouped into the same group by the AP. The results of the directional measurement may also be combined with the results of RTT-measurement and/or with the results of RSSI to determine the location of the terminal devices, which are on the range of the AP.

Referring to FIG. 6B, the AP 100 requests the terminal devices 102, 104 and 106 to perform the directional measurements 614, 616, 618, 620, 622, 624 regarding the access points 130 and 120. AP 100 may utilize the determined directional information for grouping the terminal devices. The measurement results may be utilized alternatively or in addition to the other location information or radio measurement results. Referring to FIG. 6A, the terminal devices 104 and 106 seems to be close each other, in other words within certain radio distance from each other, and hence the directional measurement results may be assumed to be similar, and therefore the terminal devices 104 and 106 may be grouped into the same group. The terminal device 102 seems to be far from the terminal devices 104 and 106, in other words it is not within certain radio distance from the terminal devices 104 and 106, and therefore the directional measurement results may be different compared to the results of the terminal devices 102 and 104. Based on this the AP 100 may not group the terminal device 102 into the same group with the terminal devices 104 and 106.

Hence, the radio measurement results may be used in many different ways for grouping the terminal devices. The grouping may be based on similarity and/or comparison of results obtained from different terminal devices. Different radio measurement metrics may include communication RTT, direction, and/or signal strength. Although examples of FIGS. 6A and 6B show measurements on different APs 120, 130, it is equally possible to perform measurements on different terminal devices, or both. It is noted that the measured wireless apparatus (e.g. AP or terminal device) may transmit its identity (e.g. unique identifier). Hence, the radio measurement results may be comparable as the identity of the measured wireless apparatus may be known, for example.

Figure 7:
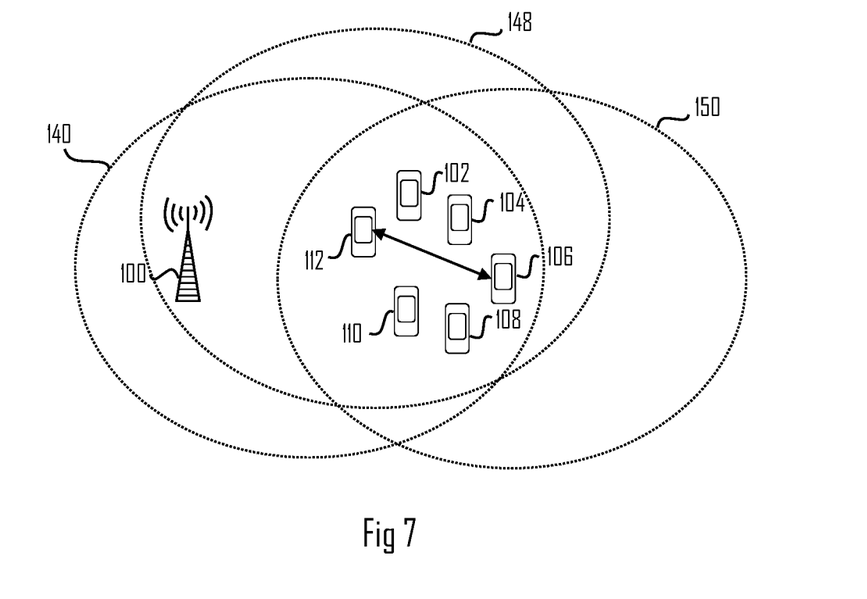
FIG. 7 illustrates an embodiment of selecting two or more terminal devices to reply.

FIG. 7 illustrates an embodiment for selecting two or more terminal devices to reply with the CTS message to the MU-RTS message. In the situation where the radio distance between e.g. two terminal devices in the same group is great enough, it may be beneficial to select the both terminal devices to reply with the CTS to the MU-RTS transmitted by the AP. Thus, the protection area may be enlarged compared with the situation if only one terminal device is selected to respond. Referring to FIG. 7, the terminal devices 102, 104, 106, 108, 110, 112 are grouped into the same group based on their location information and/or radio measurement results (sometimes referred to as radio measurement information). The radio distance between the terminal devices 106 and 112 is within the certain limit so that they are grouped into the same group but still great enough (i.e. exceeds another limit) so that it may be beneficial to select both terminal devices 106, 112 to reply with the CTS message. When the terminal devices 106 and 112 reply with CTS message it may form a larger CTS protection area to protect the transmission. In case that e.g. the terminal device 106 is selected to reply with the CTS message behalf of the whole group, it may not necessarily provide sufficient protection for the terminal device 112 because its radio distance is large from the terminal device 106. In this kind of cases, the access point 100 may select the both terminal devices 106 and 112 to reply with the CTS message. When the both terminal devices 106 and 112 are requested to reply with the CTS, it forms a CTS protection area 148 of the terminal device 112 as well as a CTS protection are 150 of the terminal device 106 for protecting the transmission. The CTS protection areas 148 and 150 together form the wider protection area that protects the transmissions of all the terminal devices placed into the same group. The MU-RTS message may thus indicate both terminal devices 106, 112, so that both may determine that they are requested to respond. In some cases more than two responders are selected. In such case, the MU-RTS message indicates each selected responder. It is also noted that if the radio distance between two group members (e.g. radio distance between terminal devices 106 and 112 indicated by the arrow) does not exceed the threshold, the AP 100 may select only one terminal device of the group to reply with the CTS message.

It is further noted that the AP 100 may act accordingly if it receives at least one response (e.g. CTS) from at least one terminal device of the group. I.e. the process may be regarded as successful if at least one CTS message is received. Then the AP 100 may continue on scheduling transmissions, such as OFDMA data frames. According to an embodiment, if no CTS response is received from at least one member of the group, the AP 100 does not transmit anything to the group members and/or groups. An embodiment provides an apparatus comprising at least one processor and at least one memory including a computer program code, wherein the at least one memory and the computer program code are configured, with the at least one processor, to cause the apparatus to carry out the procedures of the above-described access point, e.g. the access point 100, 120, or 130. The at least one processor and at least one memory including the computer program code may form means for carrying out the procedures described above.

In an embodiment, the AP 100 selects one terminal device of each group (e.g. one or more groups) to respond with the CTS message. In case no response is received from the selected terminal device, the AP 100 may either decide not to schedule transmission for that group or select some other terminal device from the same group, transmit another MU-RTS, and initiate receiving response from said selected some other terminal device or devices.

According to an embodiment, the AP 100 selects the terminal device arbitrarily amongst the group. According to an embodiment, the AP 100 selects the terminal device based on determining that the terminal device is located centrally in the group and/or represents average terminal device location in the group. As noted, the group members may have similar media and/or channel state view compared with each other which may be revealed by the location and/or radio measurement information on the terminal devices.

Figure 8:
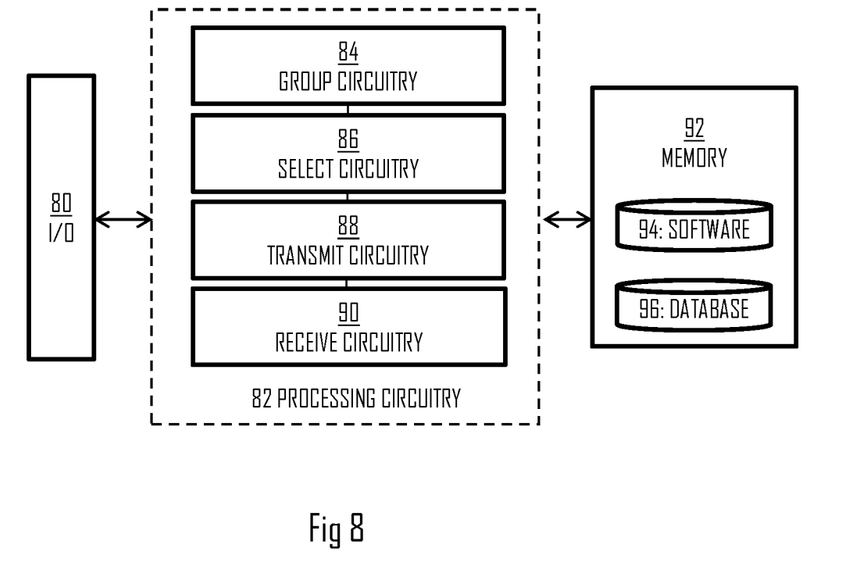
FIGS. 8 and 9 illustrate block diagrams of apparatuses according to some embodiments.

An embodiment provides an apparatus comprising at least one processor and at least one memory including a computer program code, wherein the at least one memory and the computer program code are configured, with the at least one processor, to cause the apparatus to carry out the procedures of the above-described terminal device, e.g. the terminal device 102. The at least one processor and at least one memory including the computer program code may form means for carrying out the procedures described above. FIG. 8 illustrates a block diagram of a structure of an apparatus. The apparatus may be comprised in the access point or, in some embodiments, the apparatus is the access point providing the radio access. The apparatus comprises a processing circuitry 82 comprising the at least one processor. The processing circuitry 82 may comprise a group circuitry 84 configured to perform the grouping of the terminal devices, select circuitry 86 configured to perform the selection of the terminal devices which reply to the transmission request message, transmit circuitry 88 configured to transmit the transmission request message and receive circuitry 90 configured to receive the transmission response message.

The processing circuitry 82 may comprise the circuitries 84 to 90 as sub-circuitries, or they may be considered as computer program modules executed by the same physical processing circuitry. The memory 92 may store one or more computer program products 94 comprising program instructions that specify the operation of the circuitries 84 to 90. The apparatus may further comprise a communication interface 80 providing the apparatus with radio communication capability in a wireless network managed by the access point comprising the apparatus. The communication interface 80 may provide the apparatus with communication capability with other access points, terminal devices and/or with the centralized resource coordinator. The communication interface 80 may comprise a radio communication circuitry enabling wireless communications and, in some embodiments, a wired communication circuitry enabling wired communications.

Figure 9:
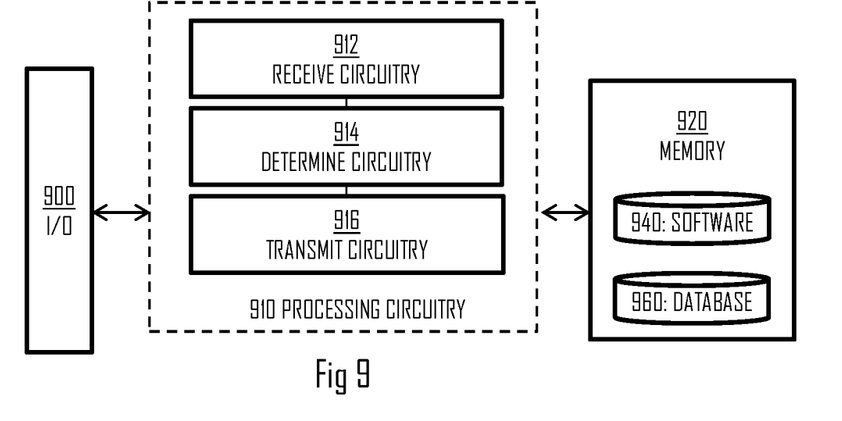

FIG. 9 illustrates a block diagram of a structure of an apparatus. The apparatus may be comprised in a terminal device (e.g. terminal device 102) or, in some embodiments, the apparatus is the terminal device 102 or similar terminal device. The apparatus comprises a processing circuitry 910 comprising the at least one processor. The processing circuitry 910 may comprise a receiving circuitry 912 configured to receive transmission request messages. a determine circuitry 914 configured to determine whether the terminal device is amongst selected responders and a transmit circuitry 916 configured to transmit transmission response messages to the access point on behalf of a group of terminal devices.

The processing circuitry 910 may comprise the circuitries 912 to 916 as sub-circuitries, or they may be considered as computer program modules executed by the same physical processing circuitry. The memory 920 may store one or more computer program products 940 comprising program instructions that specify the operation of the circuitries 912 to 916. The apparatus may further comprise a communication interface 900 providing the apparatus with radio communication capability in a wireless network. The communication interface 900 may further provide the apparatus with communication capability with other terminal devices, access points and/or with the centralized resource coordinator. The communication interface 900 may comprise a radio communication circuitry enabling wireless communications and, in some embodiments, a wired communication circuitry enabling wired communications.

Although MU-RTS and CTS messages are used herein, they need to be understood as examples, and thus the embodiments may be applicable to other similar messaging schemas. However, the provided embodiments may be particularly beneficial for enhancing the MU-RTS/CTS transmission.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor (s)/software including digital signal processor(s), software, and at least one memory that work together to cause an apparatus to perform specific functions; and (c) circuits, such as a microprocessor(s) or a portion of a microprocessor (s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in connection with FIGS. 2A to 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless systems defined above but also to other suitable communication systems. The protocols used, the specifications of communication systems and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method in an access point, the method comprising:
   grouping a plurality of terminal devices that are within certain radio distance from each other into a same group;
   selecting more than one terminal device of the group to reply to a transmission request message on behalf of the group, when a radio distance between two terminal devices in the group exceeds a threshold;
   transmitting the transmission request message, wherein the transmission request message indicates the more than one selected terminal device of the group that should reply to the transmission request message on behalf of the group; and
   in response to the transmitting the transmission request message, initiating receiving a transmission response message from the more than one selected terminal device on behalf of the group.

2. The method of claim 1, wherein the grouping is based at least on location information on the plurality of terminal devices.

3. The method of claim 2, wherein the location information on the terminal devices comprises satellite positioning data and/or positioning data from a separate indoor positioning system.

4. The method of claim 1, wherein the grouping is based at least on radio measurement results obtained on the basis of radio measurements performed by the plurality of terminal devices.

5. The method of claim 4, wherein the method further comprises:
   transmitting a request message requesting the plurality of terminal devices to perform the radio measurements;
   receiving the radio measurement results in response to the request message; and
   grouping the terminal devices based at least on comparing the radio measurement results obtained from the plurality of terminal devices.

6. The method of claim 5, wherein the request message requests the plurality of terminal devices to perform radio measurements regarding one or more neighbouring access points.

7. The method of claim 5, wherein the request message requests the plurality of terminal devices to perform radio measurements on other terminal devices.

8. The method of claim 4, wherein the radio measurement results comprise information indicative of round trip time between the terminal devices and a first wireless apparatus and round trip time between the terminal devices and a second wireless apparatus.

9. The method of claim 4, wherein the radio measurement results comprise direction information indicating direction of a first wireless apparatus with respect to the terminal devices and direction of a second wireless apparatus with respect to the terminal devices.

10. The method of claim 4, wherein the radio measurement results comprise signal strength information indicating a signal strength between the terminal devices and a first wireless apparatus, and the signal strength between the terminal devices and a second wireless apparatus.

11. The method of claim 1, wherein the transmission request message comprises information indicating the more than one selected terminal device requested to reply to the transmission request message and scheduling information for transmitting the transmission response message by the two selected terminal device.

12. A method in a terminal device of a wireless network, the method comprising:
   receiving, from an access point of the wireless network, a transmission request message indicating more than one selected terminal device of a group, wherein the more than one selected terminal device is selected by the access point to respond to the transmission request message on behalf of the group of a plurality of terminal devices that are within certain radio distance from each other, when a radio distance between two terminal devices in the group exceeds a threshold;
   determining whether or not the terminal device is a selected terminal device; and
   in response to determining that the terminal device is selected, transmitting a transmission response message to the access point on behalf of the group.

13. An apparatus comprising:
   one or more processor; and
   one or more memory including a computer program code, wherein the one or more memory and the computer program code are configured, with the one or more processor, to cause an access point to:
   group a plurality of terminal devices that are within certain radio distance from each other into a same group;

select more than one terminal device of the group to reply to a transmission request message on behalf of the group, when a radio distance between two terminal devices in the group exceeds a threshold;

transmit the transmission request message, wherein the transmission request message indicates the more than one selected terminal device of the group that should reply to the transmission request message on behalf of the group; and in response to the transmitting the transmission request message, initiate receive a transmission response message from the more than one selected terminal device.

14. The apparatus of claim 13, wherein the grouping is based at least on radio measurement results obtained on the basis of radio measurements performed by the plurality of terminal devices and wherein the one or more memory and the computer program code are configured, with the one or more processor, to cause the access point to perform transmitting a request message requesting the plurality of terminal devices to perform the radio measurements, receiving the radio measurement results in response to the request message, and grouping the terminal devices based at least on comparing the radio measurement results obtained from the plurality of terminal devices.

15. An apparatus comprising:
one or more processor; and
one or more memory including a computer program code, wherein the one or more memory and the computer program code are configured, with the one or more processor, to cause a terminal device to:
receive, from an access point of the wireless network, a transmission request message indicating more than one selected terminal device, wherein the more than one terminal device is selected by the access point to respond to the transmission request message on behalf of a group of a plurality of terminal devices that are within certain radio distance from each other, when a radio distance between two terminal devices in the group exceeds a threshold;
determine whether or not the terminal device is a selected terminal device; and
in response to determining that the terminal device is selected, transmit a transmission response message to the access point on behalf of the group.

16. A non-transitory computer readable medium comprising program instructions for causing an access point to perform at least the following:
grouping a plurality of terminal devices that are within certain radio distance from each other into a same group;
selecting more than one terminal device of the group to reply to a transmission request message on behalf of the group, when a radio distance between two terminal devices in the group exceeds a threshold;
transmitting the transmission request message, wherein the transmission request message indicates the more than one selected terminal device of the group that should reply to the transmission request message on behalf of the group; and
in response to the transmitting the transmission request message, initiating receiving a transmission response message from the more than one selected terminal device.

17. A non-transitory computer readable medium comprising program instructions for causing a terminal device to perform at least the following:
receiving, from an access point of the wireless network, a transmission request message indicating more than one selected terminal device, wherein the more than one terminal device is selected by the access point to respond to the transmission request message on behalf of a group of a plurality of terminal devices that are within certain radio distance from each other, when a radio distance between two terminal devices in the group exceeds a threshold;
determining whether or not the terminal device is a selected terminal device; and
in response to determining that the terminal device is selected, transmitting a transmission response message to the access point on behalf of the group.

* * * * *